Patented Apr. 18, 1944

2,346,922

UNITED STATES PATENT OFFICE 2,346,922

METALLIZABLE AZO DYE

Oliver H. Johnson, Edgewood Arsenal, Md., assignor to E. I. du Pont de Nemours & Company, Wilmington, Del., a corporation of Delaware No Drawing. Application June 13, 1941, Serial No. 397,901

8 Claims. (Cl. 260—147)

This invention relates to azo dyes and especially to such dyes in which one of the components is a nucleus of the anthraquinone series having an hydroxy group ortho to the azo bridge. In general, the dyes of the invention are soluble and they are suitable for dyeing various dyeable fibers, especially wool. Metal complexes of these dyes may be formed and in this form they provide dyeings on wool which are unusually deep in shade and have superior fastness properties as compared to metallized azo compounds in which the component corresponding to the anthraquinone component is from the benzene or naphthalene series.

Monazo compounds composed of benzene and naphthalene components and having 2,2'-hydroxy groups are known. That they are capable of dyeing wool and of forming metal complexes is also known. The fastness properties of such dyes are not entirely satisfactory and improvements in the field of metallizable dyes are desirable.

It is among the objects of this invention to provide new metallizable azo dyes with which various fibers, especially wool can be dyed from aqueous solutions thereof, and which in the form of their metal complexes provide dyeings on wool in deep shades having superior fastness properties.

The objects of the invention are attained by providing monazo dyes in which one of the components is an aminohydroxy anthraquinone in which the coupling is ortho to the hydroxy group and which may contain other substituents; and the other component is a radical of a naphthol sulfonic acid or a sulfo-phenyl pyrazolone. The latter may also have other substituents. In forming the compounds, an ortho-amino-hydroxy anthraquinone is diazotized and coupled with a suitable azo dye coupling component of the class consisting of the naphthol sulfonic acid series or the sulfo-phenyl pyrazolone series, the coupling being made in the ortho position to a hydroxy group. The compounds contain at least one sulfonic acid group but they may contain more than one. When more than one is present, the additional sulfonic acid groups may be in either or both nuclei. Accordingly the components are selected so as to provide a compound of the type which in the form of its acid is represented by the formula

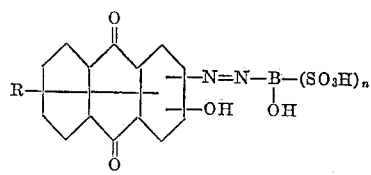

in which the azo bridge is ortho to the —OH groups, —B— is the nucleus of a compound of the group consisting of the naphthol sulfonic acid series and the sulfo-phenyl pyrazolone series; $n$ is an integer not greater than 2; and R is one of a group consisting of hydrogen, hydroxy, halogen, anilido and sulfonic acid.

The invention will be more fully set forth in the following more detailed description which includes examples that are given as illustrative embodiments of the invention and not as limitations thereof. Parts are expressed in parts by weight unless otherwise noted.

Example 1

To ninety-two (92) parts of 96% sulfuric acid is added slowly at 10° C. four (4) parts of dry sodium nitrite. After solution is complete ninety-two (92) parts of 100% sulfuric acid is added and the temperature is allowed to rise to 25-28° C. Then eleven and ninety-five one hundredths parts (11.95) of 2-amino-3-hydroxy-anthraquinone is added slowly in powdered condition to the nitrosyl sulfuric acid solution so prepared over a two hour period. The solution is heated to 40° C. for twenty minutes. It is then cooled, and poured slowly with stirring into three hundred thirty (330) parts of an ice-water mixture. After stirring for several minutes the suspension is filtered to remove the insoluble diazonium sulfate. This moist press cake is added slowly to fifteen and nine-tenths (15.9) parts of 1-(2'-chloro-5'-sulfophenyl)-3-methyl-5-pyrazolone dissolved in five hundred (500) parts of water at 0° C. containing thirty-one and eight tenths (31.8) parts of sodium carbonate. The coupling is rapid and when complete the reaction medium is diluted with five hundred (500) parts of water and the solution is heated to boiling with two (2) parts of charcoal and then filtered hot. The filtrate is neutralized with 10 normal hydrochloric acid solution and allowed to cool. The dye is filtered from the cold solution.

In its acid form the unmetallized dye is represented by the formula

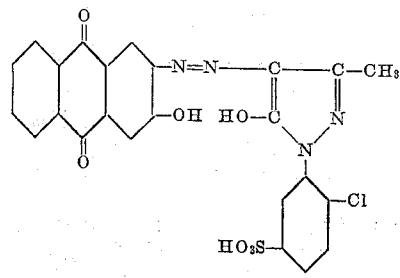

The copper complex is formed by suspending the dye in five hundred (500) parts of water and heating to boiling. Then a solution of fifteen (15) parts of crystalline copper sulfate in one hundred (100) parts of water are added to the hot suspension and the mixture is boiled for a time sufficient to metallize the dye, keeping the volume constant by further additions of water as required, three hours' boiling being sufficient. Sodium chloride is added to the solution until a concentration of 5-6% is reached and the solution is allowed to cool. The precipitated dye is filtered off and dried. It dyes wool from a neutral or weakly acidic dyebath in very reddish shades of brown which are very fast to light, washing and fulling tests.

The chromium complex is prepared by similar procedure with the exception that the time of boiling is increased, twenty-four hours and twelve (12) parts of chromic fluoride being sufficient. This dye colors wool from a neutral or weakly acidic dyebath in red shades which are very fast to light, washing, fulling, and carbonizing tests.

The nickel complex is prepared in exactly the same manner as the copper complex except that fourteen (14) parts of nickel acetate are used. This dye colors wool from a neutral or weakly acidic dyebath in red-brown shades of excellent fastness to light, washing and fulling tests.

The cobalt complex is made exactly like the copper complex except that an equal weight of cobalt acetate is substituted for the copper sulfate used there. This dye colors wool from a neutral or weakly acidic dyebath in red-brown shades of excellent fastness to light, washing, and fulling tests.

The following illustrations are other dyes of the class and their metal complexes. The indicated shades are the shades of dyeings on wool. These dyes, their metal complexes and the dyeings were made by methods which are similar to those indicated in the foregoing illustrations, and they have similar excellent fastness properties.

can be used wherein R is one of a group consisting of hydrogen, hydroxy, halogen, anilido and sulfonic acid. Other illustrations of such anthraquinones are 1-amino-2-hydroxy-4-chloro-anthraquinone and 1-hydroxy-2-amino-3-bromo-anthraquinone.

As illustrations of other coupling components which can be coupled with such diazotized ortho-hydroxy-amino-anthraquinones and which give metallized dyeings having the advantageous properties of those described are the naphthol sulfonic acids, such as 1-naphthol-5-sulfonic acid, 2-naphthol-6-sulfonic acid, 2-naphthol-7-sulfonic acid, 1-amino-8-naphthol-4-sulfonic acid, 1-amino-8-naphthol-3,6-disulfonic acid, 1-amino-8-naphthol-3-sulfonic acid, 2-amino-5-naphthol-7-sulfonic acid, 1-acetamino-8-naphthol-4-sulfonic acid, 1-acetamino-8-naphthol-3,6-disulfonic acid, 1-acetamino-8-naphthol-3-sulfonic acid, 2-acetamino-5-naphthol-7-sulfonic acid, 2-amino-8-naphthol-6-sulfonic acid, 2-acetamino-8-naphthol-6-sulfonic acid, 1-amino-8-naphthol-2,4-disulfonic acid, 2-naphthol-3,6-disulfonic acid, the sulfo-phenyl-pyrazolones, such as 1-(3'-sulfo-phenyl)-3-methyl-5-pyrazolone, 1-(4'-sulfo-phenyl)-3-methyl-5-pyrazolone, 1-(3'-sulfo-phenyl)-5-pyrazolone-3-carboxylic acid, 1-(4'-sulfo-phenyl)-5-pyrazolone-3-carboxylic acid, 1-(2',5'-dichloro-4'-sulfo-phenyl)-3-methyl-5-pyrazolone, 1-(2',5'-dichloro-4'-sulfo-phenyl)-5-pyrazolone-3-carboxylic acid, 1-(2',5'-disulfo-phenyl)-3-methyl-5-pyrazolone, 1-(2',5'-disulfo-phenyl)-5-pyrazolone-3-carboxylic acid, 1-(2'-methyl-4'-sulfo-phenyl)-3-methyl-5-pyrazolone, 1-(2'-methyl-4'-sulfo-phenyl)-5-pyrazolone-3-carboxylic acid, 1-(4'-chloro-3'-sulfo-phenyl)-3-methyl-5-pyrazolone, 1-(4'-chloro-3'-sulfo-phenyl)-5-pyrazolone-3-carboxylic acid, 1-(3'-sulfo-6'-hydroxy-phenyl)-3-methyl-5-pyrazolone and 1-(3'-sulfo-6'-hydroxy-phenyl)-5-pyrazolone-3-

| Example | Diazo component | Coupling component | Metal complex | Shade |
|---|---|---|---|---|
| 2 | 1,2-dihydroxy-3-amino-anthraquinone. | m-Sulfo-phenyl-methyl-pyrazolone | Chromium | Yellow-brown. |
| 3 | do | do | Copper | Do. |
| 4 | do | 2-napthol-3,6-disulfonic acid | Chromium | Do. |
| 5 | do | do | Copper | Do. |
| 6 | do | 1-acetylamino-8-naphthol-4-sulfonic acid. | Chromium | Do. |
| 7 | do | do | Copper | Do. |
| 8 | 1-hydroxy-2-amino-3-sulfo-anthraquinone. | m-Sulfo-phenyl-methylpyrazolone | Chromium | Do. |
| 9 | do | do | Copper | Do. |
| 10 | do | 1-acetylamino-8-naphthol-4-sulfonic acid. | Chromium | Olive-brown. |
| 11 | 1-amino-2-hydroxy-4-anilino-anthraquinone. | m-Sulfo-phenyl-methyl-pyrazolone | do | Blue-gray. |
| 12 | do | 1-acetylamino-8-naphthol-4-sulfonic acid. | do | Do. |
| 13 | 1-amino-2-hydroxy-anthraquinone | m-Sulfo-phenyl-methyl pyrazolone | do | Red-brown. |
| 14 | do | do | Copper | Yellow-brown. |
| 15 | do | 2'-chloro-5'-sulfo-phenyl-methyl-pyrazolone. | Chromium | Red-brown. |
| 16 | do | do | Copper | Yellow-brown. |
| 17 | do | 3'-sulfo-4'-chloro-phenyl-methyl-pyrazolone. | Chromium | Red-brown. |
| 18 | do | do | Copper | Yellow-brown. |
| 19 | 2-amino-1-hydroxy-anthraquinone | m-Sulfo-phenyl-methyl-pyrazolone | Chromium | Red. |
| 20 | do | do | Copper | Red-brown. |
| 21 | do | 2'-chloro-5'-sulfo-phenyl-methyl-pyrazolone. | Chromium | Red. |
| 22 | do | do | Copper | Red-brown. |
| 23 | do | 3'-sulfo-4'-chloro-phenyl-methyl-pyrazolone. | Chromium | Red. |
| 24 | do | do | Copper | Red-brown. |

When the dye is formed from a diazo of an anthraquinone, any ortho-hydroxy-amino-anthraquinone of the general formula

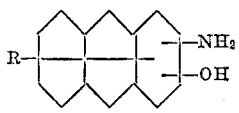

carboxylic acid; and other members of the sulfo-phenyl-pyrazolone series such as the methyl and ethyl esters of the above named sulfo-phenyl-pyrazolone-carboxylic acids.

The metal complexes are made in general by heating the azo compound in an aqueous slightly acid to alkaline medium in the presence of a soluble salt of a non-ferrous metal having an atomic weight of at least 52 and not greater than 64 from groups VI and VIII of the periodic table of elements until a metal complex is formed. The constitution of such metal complexes is not definitely known and no attempt is made to represent them graphically. Any water soluble salt of the indicated metals can be used. For satisfactory metallization, at least 1 mole equivalent of the metal should be present in the metallizing medium per mole of the azo compound, but a considerable excess may be present.

The dyes of the present invention have in general better fastness properties and depth of shade than types which are similar except that they contain benzene or naphthalene nuclei instead of the indicated anthraquinone nuclei. They are especially useful in that strong dyeings on wool can be produced from neutral and slightly acid dyebaths.

I claim:

1. A dye of a group consisting of the compounds and the metal complexes thereof which in the acid form are represented by the formula.

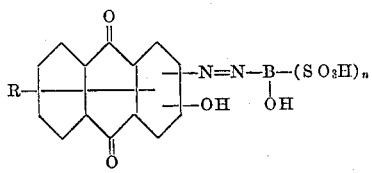

wherein the —OH groups are ortho to the azo bridge, R is one of a group consisting of hydrogen, hydroxy, halogen, anilido and sulfonic acid; —B— is the nucleus of one of the group consisting of azo dye coupling components of the naphthol sulfonic acid series and the sulfo-phenyl-pyrazolone series; and n is an integer not greater than 2, said metal being from a group consisting of copper, chromium, nickel and cobalt.

2. A metal complex of a compound which in its acid form is represented by the formula

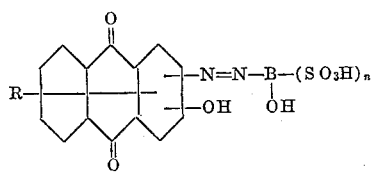

wherein the —OH groups are ortho to the azo bridge, R is one of a group consisting of hydrogen, hydroxy, halogen, anilido and sulfonic acid; —B— is the nucleus of one of the group consisting of azo dye coupling components of the naphthol sulfonic acid series and the sulfo-phenyl-pyrazolone series; and n is an integer not greater than 2, said metal being from a group consisting of copper, chromium, nickel and cobalt.

3. A dye of a group consisting of the compounds and the metal complexes thereof which in the acid form is represented by the formula

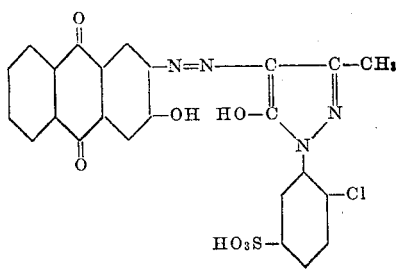

said metal being from a group consisting of copper, chromium, nickel and cobalt.

4. The chromium complex of a dye which in the acid form is represented by the formula

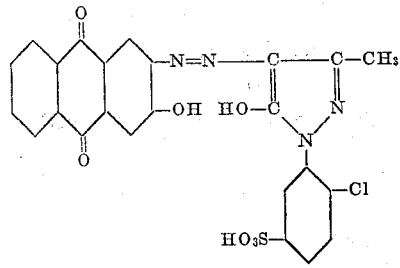

5. The copper complex of a dye which in the acid form is represented by the formula

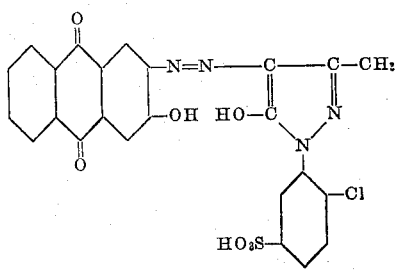

6. The copper complex of a dye which in the form of its acid is represented by the formula

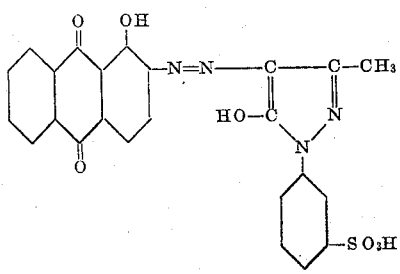

7. The process which comprises diazotizing an ortho-hydroxy-amino-anthraquinone which is represented by the formula

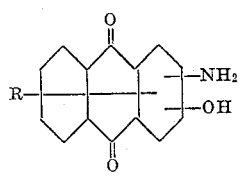

wherein R is one of a group consisting of hydrogen, hydroxy, halogen, anilido and sulfonic acid; and coupling in a position ortho to an hydroxy group with a compound of the group consisting of azo dye coupling components of the naphthol sulfonic acid series and the sulfo-phenyl-pyrazolone series, said compounds being represented by the formula

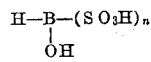

wherein B is the nucleus of said compound and n is an integer not greater than 2.

8. The process which comprises heating in a slightly acid to alkaline medium which in the form of its acid is represented by the formula

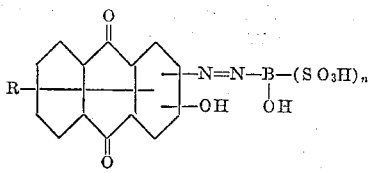

wherein the —OH groups are ortho to the azo bridge, R is one of a group consisting of hydrogen, hydroxy, halogen, anilido and sulfonic acid; —B— is the nucleus of one of the group consisting of azo dye coupling components of the naphthol sulfonic acid series and the sulfo-phenyl-pyrazolone series; and $n$ is an integer not greater than 2, said metal being from a group consisting of copper, chromium, nickel and cobalt.

OLIVER H. JOHNSON.